United States Patent
Salmimaa et al.

(10) Patent No.: US 12,487,463 B2
(45) Date of Patent: Dec. 2, 2025

(54) DETERMINING VISUAL ATTENTION

(71) Applicant: Nokia Technologies Oy, Espoo (FI)

(72) Inventors: Marja Pauliina Salmimaa, Tampere (FI); Akos Vetek, Espoo (FI); Aleksi Ikkala, Espoo (FI); Tero Simo Ilari Jokela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/953,917

(22) Filed: Nov. 20, 2024

(65) Prior Publication Data

US 2025/0180905 A1    Jun. 5, 2025

(30) Foreign Application Priority Data

Nov. 30, 2023 (GB) .................................. 2318266

(51) Int. Cl.
*G02B 27/01* (2006.01)
*G02B 27/00* (2006.01)
*G06F 3/01* (2006.01)

(52) U.S. Cl.
CPC ..... *G02B 27/0172* (2013.01); *G02B 27/0093* (2013.01); *G06F 3/013* (2013.01)

(58) Field of Classification Search
CPC ............ G02B 27/0172; G02B 27/0093; G02B 2027/0138; G02B 2027/014;
(Continued)

(56) References Cited

U.S. PATENT DOCUMENTS 9,535,497 B2 * 1/2017 Rose ................... G06T 11/60
9,844,323 B2 * 12/2017 Pamplona .............. A61B 3/18
(Continued)

FOREIGN PATENT DOCUMENTS

CN    115454233 A    12/2022
WO    2022/149094 A1    7/2022

OTHER PUBLICATIONS

Giannopoulos, Ioannis & Kiefer, Peter & Martin, Raubal. (2015). Watch What I Am Looking At! Eye Gaze and Head-Mounted Displays. (Year: 2015).*
Extended European Search Report received for corresponding European Patent Application No. 24211360.3, dated May 6, 2025, 7 pages.

(Continued)

*Primary Examiner* — Bryan Earles
(74) *Attorney, Agent, or Firm* — Nokia Technologies Oy

(57) ABSTRACT

An apparatus and method is disclosed relating to determining visual attention of a user. The method may, for example, comprise tracking eye positions of a user during simultaneous display of first and second content to the user, wherein the first content comprises content displayed by a head-worn display device so that it is perceived by the user as located at a first distance from the user and the second content is displayed by a display screen of a further display device located at a second distance from the user. The method may also comprise modifying the display of either, or both, of the first and second content such as to modify the spatial position at which they appear with respect to one another. The method may also comprise determining which of the displayed first and second content the user is looking at based at least on eye position movements, if any, tracked subsequent to the modifying, and changing the display of other one of the first and second content which the user is not determined to be looking at such as to reduce its visibility relative to the content that the user is determined to be looking at.

21 Claims, 7 Drawing Sheets

(58) Field of Classification Search
CPC .... G02B 2027/0178; G02B 2027/0187; G02B 27/017; G02B 27/0179; G06F 3/013; G06F 3/011; A61B 3/113; A61B 5/163; G09G 5/377

See application file for complete search history.

(56) References Cited

U.S. PATENT DOCUMENTS

| | | | |
|---|---|---|---|
| 10,890,759 B1* | 1/2021 | Held | G06F 3/013 |
| 11,269,411 B1 | 3/2022 | Schritter et al. | |
| 11,353,955 B1* | 6/2022 | Burgess | G06T 7/246 |
| 11,537,260 B1* | 12/2022 | Wang | G06F 3/011 |
| 11,659,988 B2* | 5/2023 | Abou Shousha | G16H 50/20 |
| | | | 351/222 |
| 2015/0042679 A1* | 2/2015 | Jarvenpaa | G06F 3/0304 |
| | | | 345/633 |
| 2017/0091549 A1 | 3/2017 | Gustafsson et al. | |
| 2017/0148215 A1* | 5/2017 | Aksoy | G02B 27/017 |
| 2019/0086669 A1 | 3/2019 | Percival et al. | |
| 2020/0090401 A1 | 3/2020 | Terrano | |
| 2022/0146819 A1* | 5/2022 | Boyle | G02B 27/0093 |
| 2023/0119930 A1* | 4/2023 | Harviainen | H04N 13/332 |
| | | | 345/633 |
| 2023/0254470 A1 | 8/2023 | Yoshimura | |
| 2023/0280591 A1 | 9/2023 | Shin et al. | |
| 2024/0087256 A1* | 3/2024 | Hylak | G06F 3/012 |
| 2024/0319845 A1 | 9/2024 | Salmimaa et al. | |

OTHER PUBLICATIONS

Findlay et al., "Active Vision: The Psychology of Looking and Seeing", Journal of Neuro-Ophthalmology, Oxford University Press, 2003, 6 pages.

Wang et al., "Gaze-Vergence-Controlled See-Through Vision in Augmented Reality", IEEE Transactions on Visualization and Computer Graphics, vol. 28, No. 11, Nov. 2022, pp. 3843-3853.

Kocejko et al., "Gaze tracking in multi-display environment", 6th International Conference on Human System Interactions (HSI), Jun. 6-8, 2013, pp. 626-631.

Search Report received for corresponding United Kingdom Patent Application No. 2318266.0, dated May 20, 2024, 2 pages.

* cited by examiner

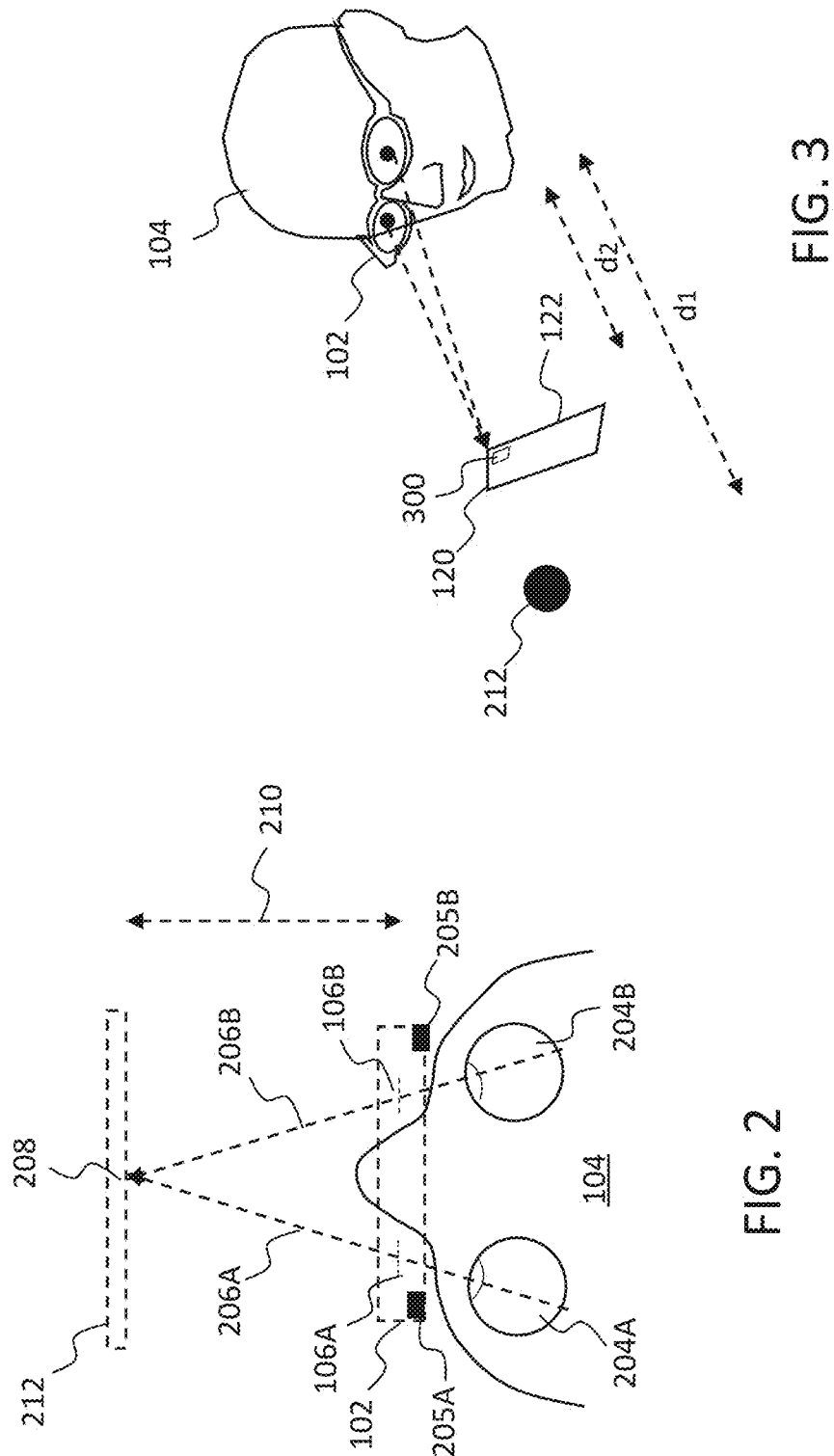

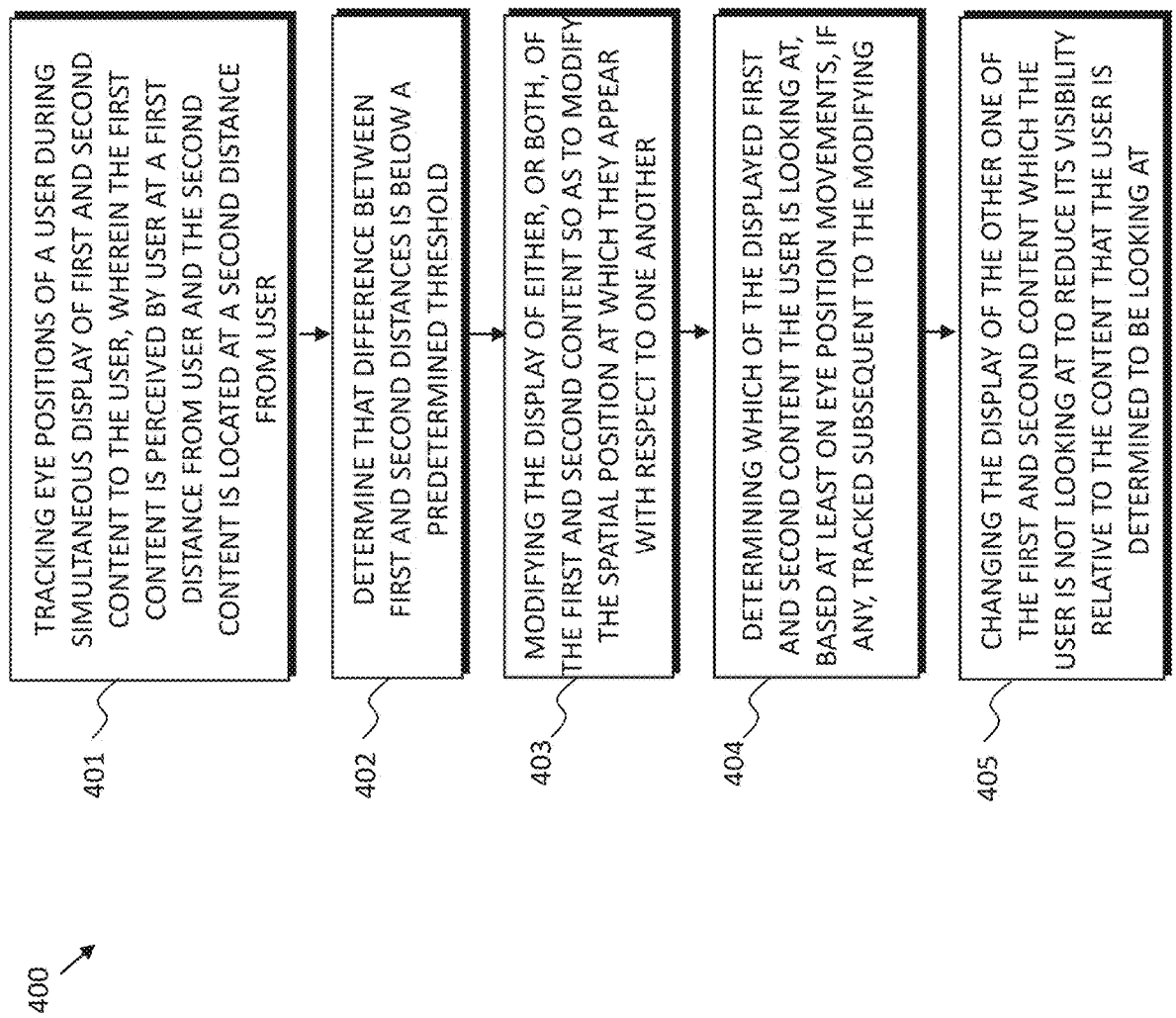

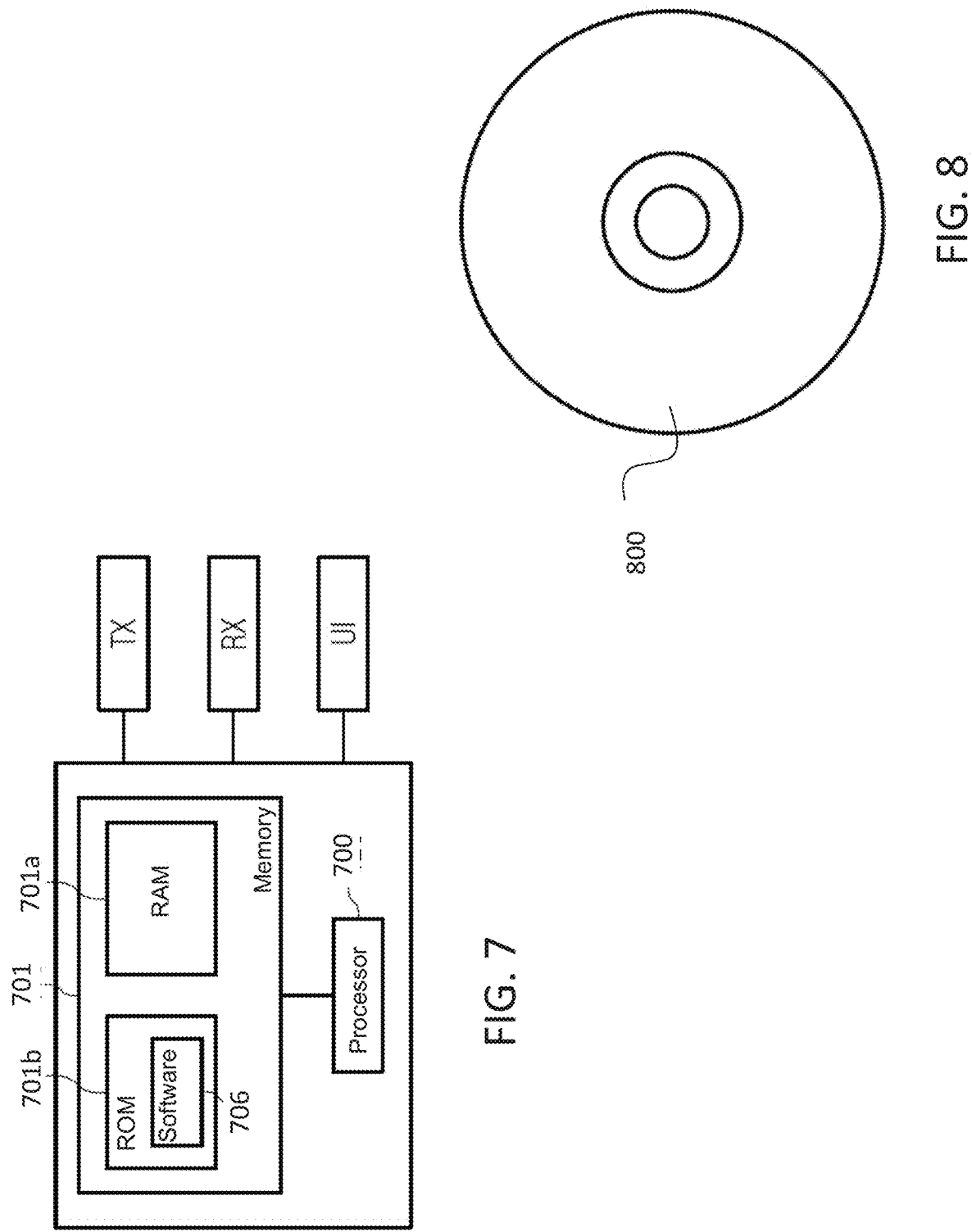

DETERMINING VISUAL ATTENTION

RELATED APPLICATION

This application claims priority to United Kingdom patent application number 2318266.0, filed on Nov. 30, 2023, the content of which is incorporated herein by reference in its entirety.

FIELD

This disclosure relates to determining visual attention of a user, for example determining which of first and second content, displayed by respective display devices, the user is currently looking at.

BACKGROUND

Users often use multiple display devices at the same time. Each display device may display content and hence a user may have multiple sets of content visible to them at the same time. Understanding which set of content the user is currently looking at, i.e. has their visual attention, can be useful.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is described an apparatus, comprising: means for tracking eye positions of a user during simultaneous display of first and second content to the user, wherein the first content comprises content displayed by a head-worn display device so that it is perceived by the user as located at a first distance from the user and the second content is displayed by a display screen of a further display device located at a second distance from the user; means for modifying, responsive to the difference between the first and second distance being below a predetermined threshold, the display of either, or both, of the first and second content such as to modify a spatial position at which they appear with respect to one another; means for determining which of the displayed first and second content the user is looking at based at least on eye position movements, if any, tracked subsequent to the modifying; and means for causing change of the display of the other one of the first and second content which the user is not determined to be looking at such as to reduce its visibility relative to the content that the user is determined to be looking at.

In some example embodiments, the apparatus may further comprise means for estimating, based on eye positions of the user, a viewing distance of the user, and wherein the means for modifying is further configured to perform the modification in response to detecting that the viewing distance corresponds to the first distance or the second distance.

In some example embodiments, the means for modifying may be further configured to perform the modification in response to determining that the first and second content at least partially overlap one another with respect to the user's field-of-view.

In some example embodiments, the means for modifying may be configured to modify the distance at which the first content is perceived by the user from the first distance to a new distance from the user, which is away from the second distance, and the means for determining which of the displayed first and second content the user is looking at may be configured to determine that the user is looking at the first content if eye position movements of the user correspond with a new viewing distance which moves towards, or matches, the new distance.

In some example embodiments, the distance at which the first content is perceived by the user may be modified a plurality of times to each of a plurality of new distances in sequence.

In some example embodiments, at least some of the new distances may be changed by a greater amount than that used for the preceding new distance of the sequence.

In some example embodiments, the distance at which the first content is perceived by the user may be modified by modifying the disparity of first and second images representing the first content which are simultaneously and respectively displayed by first and second screens of the head-worn display device.

In some example embodiments, the means for modifying may be configured to at least modify either, or both, of the first and second content such that one appears to move laterally with respect to the other.

In some example embodiments, the means for modifying may be configured to modify the first content such that it appears to move laterally at a first speed and the second content such that it appears to move laterally at a second speed, wherein the first speed is greater than the second speed.

In some example embodiments, the apparatus may further comprise means for detecting motion of the further display device with respect to the head-worn display device, wherein the means for modifying may be configured to increase/decrease the second speed as the further display device gets closer to/further from the head worn display device.

In some example embodiments, the apparatus may further comprise means for generating an initial estimate that a particular one of the first and second content is being looked at by the user, wherein the means for modifying may be responsively configured to modify the other one of the first and second content which the user is not determined to be looking at so that it appears to move laterally whilst maintaining the particular content static.

In some example embodiments, changing the display of the other one of the first and second content which the user is not determined to be looking at may comprise: disabling display of the other content; reducing luminance of the other content; reducing colour saturation of the other content; increasing transparency of the other content; changing angular resolution of the other content; and/or changing spatial resolution of the other content.

In some example embodiments, in response to determining that the user is looking at the second content, changing the other one of the first and second content which the user is not determined to be looking at may comprise changing the distance at which the first content is perceived by the user such that it is behind the second content.

According to a second aspect, there is described a method, comprising: tracking eye positions of a user during simultaneous display of first and second content to the user, wherein the first content comprises content displayed by a head-worn display device so that it is perceived by the user as located at a first distance from the user and the second content is displayed by a display screen of a further display device located at a second distance from the user; modifying, responsive to the difference between the first and second distance being below a predetermined threshold, the display of either, or both, of the first and second content such as to modify a spatial position at which they appear with respect to one another; determining which of the displayed first and second content the user is looking at based at least on eye position movements, if any, tracked subsequent to the modifying; and causing change of the display of the other one of the first and second content which the user is not determined to be looking at such as to reduce its visibility relative to the content that the user is determined to be looking at.

In some example embodiments, the method may further comprise estimating, based on eye positions of the user, a viewing distance of the user, and wherein the modification may be performed in response to detecting that the viewing distance corresponds to the first distance or the second distance.

In some example embodiments, the modification may be performed in response to determining that the first and second content at least partially overlap one another with respect to the user's field-of-view.

In some example embodiments, the modification may modify the distance at which the first content is perceived by the user from the first distance to a new distance from the user, which is away from the second distance, and the user may be determined to be looking at the first content if eye position movements of the user correspond with a new viewing distance which moves towards, or matches, the new distance.

In some example embodiments, the distance at which the first content is perceived by the user may be modified a plurality of times to each of a plurality of new distances in sequence.

In some example embodiments, at least some of the new distances may be changed by a greater amount than that used for the preceding new distance of the sequence.

In some example embodiments, the distance at which the first content is perceived by the user may be modified by modifying the disparity of first and second images representing the first content which are simultaneously and respectively displayed by first and second screens of the head-worn display device.

In some example embodiments, the modification may modify either, or both, of the first and second content such that one appears to move laterally with respect to the other.

In some example embodiments, the modification may modify the first content such that it appears to move laterally at a first speed and the second content such that it appears to move laterally at a second speed, wherein the first speed is greater than the second speed.

In some example embodiments, the method may further comprise detecting motion of the further display device with respect to the head-worn display device, wherein the second speed may be increased/decreased as the further display device gets closer to/further from the head-worn display device.

In some example embodiments, the method may further comprise generating an initial estimate that a particular one of the first and second content is being looked at by the user, wherein the modification may modify the other one of the first and second content which the user is not determined to be looking at so that it appears to move laterally whilst maintaining the particular content static.

In some example embodiments, changing the display of the other one of the first and second content which the user is not determined to be looking may comprise one or more of: disabling display of the other content; reducing luminance of the other content; reducing colour saturation of the other content; increasing transparency of the other content; changing angular resolution of the other content; and/or changing spatial resolution of the other content.

In some example embodiments, in response to determining that the user is looking at the second content, the distance at which the first content is perceived by the user may be changed such that it is behind the second content.

According to a third aspect, there is described a computer program product, comprising a set of instructions which, when executed on an apparatus, is configured to cause the apparatus to carry out a method, comprising: tracking eye positions of a user during simultaneous display of first and second content to the user, wherein the first content comprises content displayed by a head-worn display device so that it is perceived by the user as located at a first distance from the user and the second content is displayed by a display screen of a further display device located at a second distance from the user; modifying, responsive to the difference between the first and second distance being below a predetermined threshold, the display of either, or both, of the first and second content such as to modify a spatial position at which they appear with respect to one another; determining which of the displayed first and second content the user is looking at based at least on eye position movements, if any, tracked subsequent to the modifying; and causing change of the display of the other one of the first and second content which the user is not determined to be looking at such as to reduce its visibility relative to the content that the user is determined to be looking at.

The third aspect may also comprise related features of the second aspect.

According to a fourth aspect, there is described a non-transitory computer readable medium comprising program instructions stored thereon to cause the apparatus to carry out a method, comprising: tracking eye positions of a user during simultaneous display of first and second content to the user, wherein the first content comprises content displayed by a head-worn display device so that it is perceived by the user as located at a first distance from the user and the second content is displayed by a display screen of a further display device located at a second distance from the user; modifying, responsive to the difference between the first and second distance being below a predetermined threshold, the display of either, or both, of the first and second content such as to modify a spatial position at which they appear with respect to one another; determining which of the displayed first and second content the user is looking at based at least on eye position movements, if any, tracked subsequent to the modifying; and causing change of the display of the other one of the first and second content which the user is not determined to be looking at such as to reduce its visibility relative to the content that the user is determined to be looking at.

The fourth aspect may also comprise related features of the second aspect.

According to a fifth aspect, there is described an apparatus comprising at least one processing core, at least one memory including computer program code, the at least one memory and the computer program code being configured to, with the at least one processing core, cause the apparatus to: track eye positions of a user during simultaneous display of first and second content to the user, wherein the first content comprises content displayed by a head-worn display device so that it is perceived by the user as located at a first distance from the user and the second content is displayed by a display screen of a further display device located at a second distance from the user; modify, responsive to the difference between the first and second distance being below a predetermined threshold, the display of either, or both, of the first and second content such as to modify a spatial position at which they appear with respect to one another; determine which of the displayed first and second content the user is looking at based at least on eye position movements, if any, tracked subsequent to the modifying; and cause change of the display of the other one of the first and second content which the user is not determined to be looking at such as to reduce its visibility relative to the content that the user is determined to be looking at.

The fifth aspect may also comprise related features of the second aspect.

DRAWINGS

Example embodiments will be described, by way of non-limiting example, with reference to the accompanying drawings, in which:

FIG. 2 is a top-plan view of an AR display system when worn by a user;

FIG. 3 is a perspective view of the FIG. 2 AR display system when worn by the user;

FIG. 4 is a flow diagram showing operations, according to some example embodiments;

FIG. 7 is a schematic view of an apparatus that may be configured to perform the FIG. 4 operations; and FIG. 8 is a plan view of a non-transitory computer-readable medium for storing instructions that may cause a processor to perform the FIG. 4 operations.

DETAILED DESCRIPTION

Figure 1:
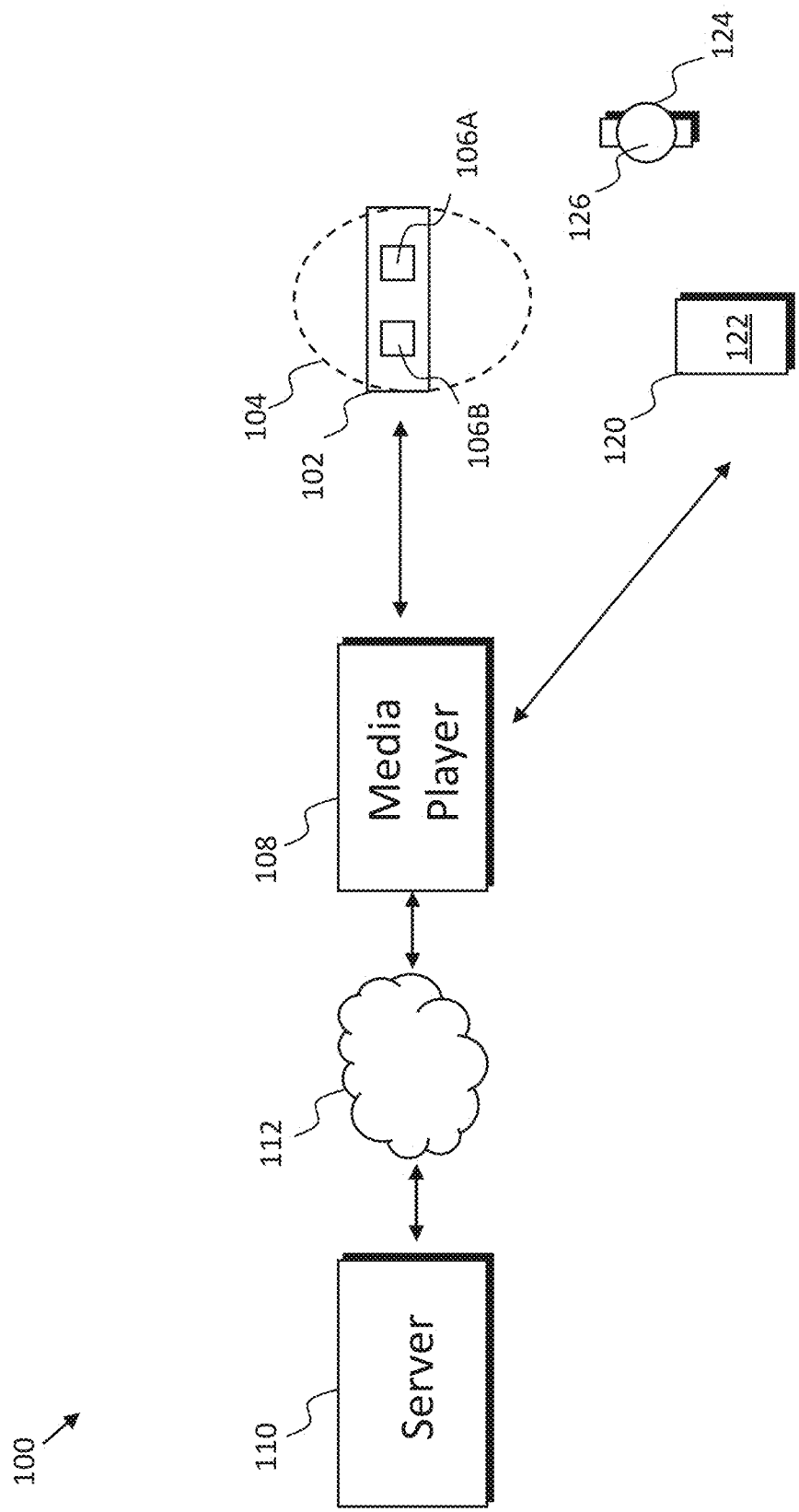
FIG. 1 is a block diagram of a system which may be useful for understanding example embodiments.

Example embodiments relate to determining visual attention of a user.

Example embodiments may relate to determining which of first and second content, displayed by respective display devices, the user is currently looking at. In other words, which of the first and second content has the user's current attention.

It is common for users to have two or more display devices showing respective content simultaneously and within their field of view. Examples of display devices include mobile phones, smartphones, tablet computers, laptop computers, personal computers, televisions, wearables such as smartwatches, and head-worn devices such as extended reality (XR) headsets, a term which may include XR glasses and near-eye displays, and Heads-Up Displays (HUDs) for vehicle windshields.

In the case of XR headsets and HUDs, particularly those adapted for augmented reality (AR) or mixed reality (MR) display, content, for example virtual content, is displayed such that it is (or will be) perceived by the user at a certain distance in front of the user's eyes to augment the real-world they see through the headset. This may be by means of displaying simultaneous images of the content to left and right-hand transparent screens of the headset, with a binocular disparity between said images causing the image to be perceived at a location which is at a certain distance (or depth) with respect to the user. That is, the difference, or disparity, in locations of the content on the left and right-hand images will cause a user's brain to perceive the content at a certain distance (or depth) with respect to the user.

Subsequent references to AR and AR headsets are intended to cover any form of technology, including MR, which involves displaying content over the real-world that the user otherwise sees through the headset, or windshield or similar in the case of a HUD.

During display of first content by an AR headset, one or more other display devices may show second content within the user's field of view. For example, the user may have a smartphone displaying the second content, for example a home screen or an active application screen. For example, an active application screen may be one that allows input of control operations for the AR headset or one that is unrelated to operations of the AR headset, e.g. a web browser, music and/or video playing application and so on. The user's primary focus or attention will be on one or other of the first and second content. How to determine which of the first and second content the user is looking at (i.e. has the user's attention) may be useful in various applications.

The term "content" may refer to visual content, which may comprise static or moving content or a combination of both. For example, visual content may comprise static images (e.g., photographs, web pages, application user interfaces) or moving images, e.g., a video or a movie. Visual content may also comprise a combination of both static and moving images, for example visual content showing a static background and a sub-portion or window showing a movie or similar. Visual content as described herein may or may not be accompanied by audio data.

For example, if it can be determined that the first content is being looked at by the user, the display of the second content can be changed in some way to reduce its visibility relative to the first content. For example, the second content may be displayed by a smartphone or a tablet computer. For example, the second content may be disabled, which may include turning-off the other display device, e.g., the smartphone or tablet computer, transitioning it to a standby mode, or changing the second content to a blank screen (e.g., all black or all white). Additionally, or alternatively, the second content may have its luminance and/or colour saturation reduced, have its transparency increased, have its angular and/or spatial resolution reduced and so on. Alternatively, or in addition to, the depth at which the first content is being displayed may be changed. For example, the first content may be displayed closer to the user's eyes. For example, if it can be determined that the second content is being looked at by the user, the other, first content can be changed using one or more of the above methods, and/or the first content can be moved in terms of where it is perceived by the user, e.g. so that it is behind or further behind the second content.

It will be apparent that there may be benefits in terms of user experience, power consumption, and utilization of processing resources among others.

FIG. 1 shows a system 100 which may be useful for understanding example embodiments.

The system 100 may comprise an AR display device 102 for use by a user 104.

The AR display device 102 may take any suitable form, e.g., a head-worn display device, such as AR goggles or glasses, or another form of AR display device, such as a windshield heads-up display (HUD), and may or may not comprise a set of ear-mountable loudspeakers for output of audio data. The AR display device 102, if head-worn, may comprise left and right-hand transparent screens 106A, 106B for display of first content, for example virtual visual content (e.g., static and/or moving images) that will be perceived by a user at a particular first distance with respect to the AR display device 102 which approximates to its distance with respect to the user 104.

The system 100 may also comprise a media player 108 which may control display of the first content to the AR display device 102; the media player 108 may be a separate device, such as a computer, mobile terminal or console, or may comprise part of the AR display device 102 itself.

For example, the media player 108 may communicate with a server 110 via a network 112 to receive the first content for storage and subsequent rendering via the AR display device 102. Alternatively, the server 110 may stream the first content to the media player 108 for subsequent output via the AR display device 102. The media player 108 may request the first content from the server 110 via one or more data messages. For example, the media player 108 may transmit an updated position or change of position (spatial and/or orientation) of the user 104 and the server 110 may be responsively update the first content to reflect the update or change in position. In some examples, the media player 108 may receive the first content not from the server 110 via the network 112 but rather from a local device, such as from one or more other display devices 120, 124 associated with the user 104 which may store the first content.

For example, the first content may be received by the AR display device 102 from the one or more other display devices 120, 124, or another device or system associated with the user. Alternatively the first content may be received by the AR display device from another source, such as the from the server 110, via the network 112, without the involvement of said one or more other display devices 120, 124.

The one or more other display devices 120, 124 may comprise, but are not restricted to, mobile devices. For example, the one or more other display devices 120, 124 may respectively comprise a smartphone having a display screen 122 and/or a smartwatch 124 having a display screen 126. The display screens 122, 126 may or may not be touch sensitive. In other examples, the one or more other display devices 120, 124 may comprise non-mobile devices, such as a television or display monitor.

In some example embodiments, it is assumed that the user 104 operates the smartphone 120 which displays second content while the AR display device 102 displays first content. FIG. 2 is a top plan view of the user 104, particularly the front part of the user's head, when the user wears the AR display device 102.

The AR display device 102 may, in addition to the left and right-hand transparent screens 106A, 106B, comprise known eye tracking technology to determine and track the position of the eyes 204A, 204B over time. Such eye tracking technology may comprise, by way of example, infrared or near-infrared light emitters 205A, 205B which respectively illuminate the pupils of the eyes 204A, 204B. Respective infrared cameras, which may be integrated with the light emitters 205A, 205B, may then measure the distance between the pupil centres and the resulting reflections, which change depending on the angle of the eyes. From this can be deduced respective vergence vectors 206A, 206B for the eyes 204A, 204B, a gaze fixation point 208 and an estimated viewing distance 210 between the gaze fixation point and the user 104.

It will be appreciated that when the user 104 is looking at the first content, which may be virtual visual content, the AR display device 102 can control at which distance the first content is perceived in front of the user's eyes 204A, 204B.

In FIG. 2, the first content is indicated by reference numeral 212. The AR display device 102 can therefore control the user's gaze fixation point 208 and viewing distance 210 by changing the distance at which the first content 212 is perceived by the user, so long as the user's attention remains on the first content.

If the user 104 however uses another display device, for example the smartphone 120 shown in FIG. 1, it may be that the user's attention changes to second content displayed by the display screen 122 of said smartphone.

As shown in FIG. 3, the second content 300 displayed by the display screen 122 of said smartphone 120 may at least partially overlap (with respect to the user's field of view) the first content 212 displayed by the AR display device 102. In this case, the first content 212 is perceived by the user 104 to be behind the second content 300.

The presence of the smartphone 120 may be recognized by one or more cameras (not shown) of the AR display device 102 using known object recognition algorithms. Such algorithms may be trained or otherwise configured to distinguish objects such as the smartphone 120 or other direct display devices from background images or other objects. The distance between the smartphone 122 and the AR display device 102 may be measured using, for example, time-of-flight sensing (e.g. performed by the AR display device or the media player 108) based on data received from the AR display device.

In the FIG. 3 scenario, the AR display device 102 (or another device such as the media player 108) may determine first and second distances, d1, d2, respectively indicating the distance at which the first content 212 is perceived by the user 104 and the distance from the second content 300 to the user.

Note that the first and second distances, d1, d2, are measured with respect to the AR display device 102 which is used as an approximation of user position.

The current gaze fixation point and viewing distance can be estimated using the current eye positions of the user 104, i.e. using updated vergence vectors 206A, 206B indicated in FIG. 2.

It can therefore be determined, initially at least, which of the first and second content 212, 300 the user 104 is looking at, based on which of the first and second distances d1, d2, the current viewing distance matches, or is closest to.

In the FIG. 3 scenario, the current convergence distance matches the second distance, d2, and hence it is determined that the user is looking at the second content 300 or the smartphone 120.

If it is determined that the first and second distances d1, d2 are the same or close to one another, or in other words that the difference between the first and second distances d1, d2 is below a predetermined threshold, the above method may not yield reliable results.

FIG. 4 is a flow diagram showing operations 400 that may be performed by one or more example embodiments. The operations 400 may be performed by hardware, software, firmware or a combination thereof. The operations 400 may be performed by one, or respective, means, a means being any suitable means such as one or more processors or controllers in combination with computer-readable instructions provided on one or more memories. The operations 400 may, for example, be performed by the AR display device 102 or the media player 108 or one of the display devices associated with the user 104 (such as the smartphone 120) or possibly a remote device such as the server 110.

A first operation 401 may comprise tracking eye positions of a user during simultaneous display of first and second content to the user.

The first video content may comprise content displayed by a head-worn display device so that it is perceived by the user as located at a first distance, d1, from the user and the second content may be displayed by a display screen of a further display device located at a second distance, d2, from the user.

A second operation 402 may comprise determining if the difference between the first and second distances d1, d2 is below a predetermined threshold.

The predetermined threshold may be a default value or a user-set value.

A third operation 403, which may be responsive to a positive outcome in the second operation 402, may comprise modifying the display of either, or both, of the first and second content such as to modify a spatial position at which they appear with respect to one another.

A fourth operation 404 may comprise determining which of the displayed first and second content the user is looking at, based at least on eye position movements, if any, tracked subsequent to the modifying.

A fifth operation 405 may comprise changing the display of the other one of the first and second content which the user is not determined to be looking at such as to reduce its visibility relative to the content that the user is determined to be looking at.

In some example embodiments, changing the display of the other content may comprise changing how it appears and/or changing the other content itself.

In some example embodiments, the terms "modifying" and "changing" in respect of the third and fifth operations 403, 405 may mean "causing modification of" and "causing change of" in the sense that the apparatus performing said operations may issue one or more control signals to another apparatus for causing it to perform the said modification and/or change of display. For example, if the operations 400 are performed by the head-worn display device, the third operation 403 may comprise the head-worn display device causing the further display device to modify the second content, for example by issuing a suitable control signal. For example, the fifth operation 405 may comprise the head-worn display device causing the further display device to change the display of the second content if that is the content which the user is not looking at. The further display device may be configured to perform the modification/changing responsive to receiving the control signal(s).

In some example embodiments, another operation may comprise, prior to the modification operation 402, estimating based on the eye positions of the user a viewing distance with respect to the user, wherein the modifying operation 402 may be performed in response to detecting that the viewing distance corresponds to the first distance, d1, or the second distance, d2. In this case, the correspondence of the viewing distance to, say, the first distance, d1, may be an initial estimate, with the modifying operation 402 being used to confirm or change the initial estimate.

In some example embodiments, the display device may display the first content so that it is perceived by the user as located at the first distance, d1, by displaying first and second images with a binocular disparity, or difference, between locations in said first and second images at which the first content appears. This will enable the first content to be perceived at the first distance, d1, from the user, based on the amount of disparity which can be calibrated in advance.

In some example embodiments, the modifying operation 402 may be performed responsive to determining that the first and second content at least partially overlap one another with respect to the user's field-of-view.

In some example embodiments, the modifying operation 402 may comprise modifying the distance at which the first content will be perceived by the user. For example the first content may be displayed so as to be perceived at a new distance, dnew, from the user which is further away from the second distance d2. The determining operation 403 may then determine that the user is attending to the first content if eye position movements of the user correspond with a new viewing distance that moves towards, or matches, the new distance dnew.

Figure 5B:
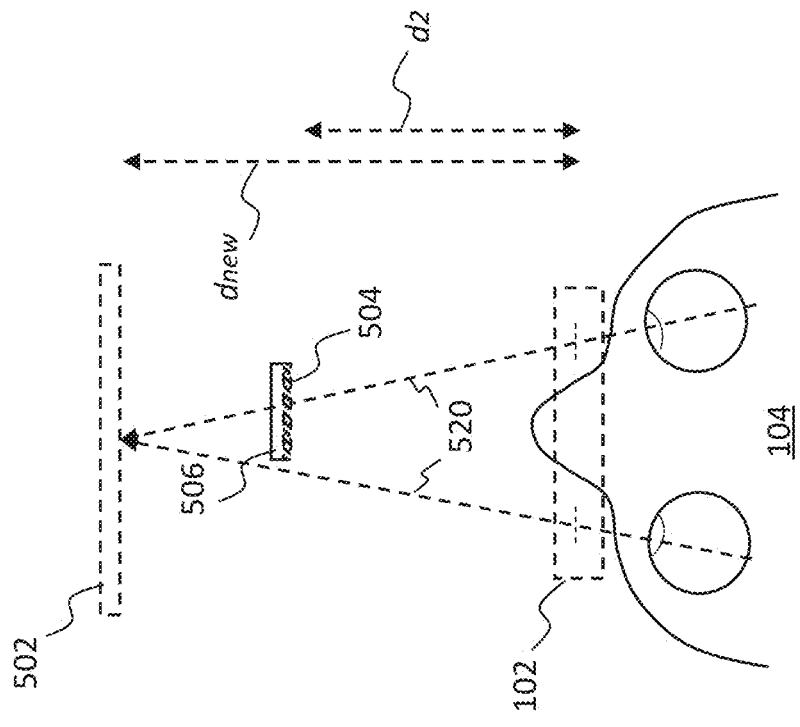
FIG. 5B is a top-plan view of the AR display system when after modifying the display of the first content, according to some example embodiments.
Figure 5A:
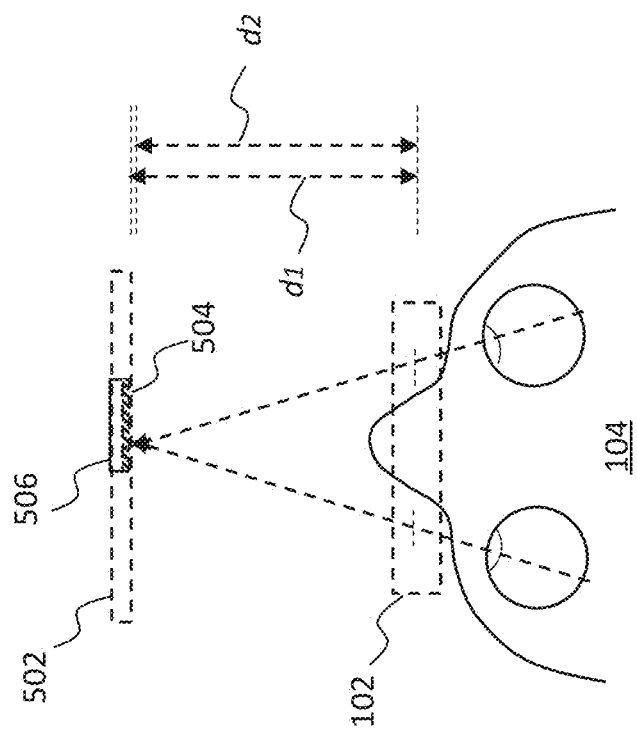
FIG. 5A is a top-plan view of an AR display system when displaying first content at substantially the same viewing distance as another display system.

FIG. 5A shows in top plan view the user 104 when viewing first and second content 502, 504.

The first content 502 is content displayed so as to be perceived at a first distance, d1, with respect to the user 104, and the second content 504 is that displayed by a smartphone 506 at a second distance, d2, with respect to the user.

The AR display device 102 or the media player 108 may determine that difference between the first and second distances, d1, d2, is below a predetermined threshold, Δd, i.e. |d1−d2|<Δd. The value of Δd may be, for example, 10 mm, 20 mm or some other suitable value.

Referring to FIG. 5B, responsive to the determination that |d1−d2|<Δd, the AR display device 102 or the media player 108 may modify the output of the first content 502 such that it is perceived at a new distance, dnew, which is further away from the second distance d2. In this way, the first content 502 appears to be behind the second content 504.

In this case, eye position movements, indicated by the vergence lines 520, change the gaze fixation point and hence viewing distance which moves towards, or matches, the new distance, dnew. It may therefore be determined that the user 104 is looking at (attending to) the first content 502 and not the second content 504.

On the other hand, if there was little or no eye position movement, the gaze fixation point and hence viewing distance will not change, or will change very little. It may therefore be determined in this case that the user 104 is looking at the second content 504 and therefore determined that the user is not looking at the other, first content 502.

In some example embodiments, the first distance, d1, may be modified a plurality of times in sequence to each of a plurality of new distances dnew in sequence. Such modifications will therefore be gradual over time so as not to overly disturb the user.

In some example embodiments, at least some of the new distances dnew may change by the same amount (e.g. 5 mm) or at least some of the new distances dnew may change by an increasing amount with respect to the previous new distance of the sequence (e.g. 5 mm, 15 mm, 30 mm) and so on.

In some example embodiments, after the modification of the first content 502 such that it is perceived at the one or more new distances dnew, its display may cycle back to an earlier distance, and then forwards again through the one or more new distances. For example, assuming the first distance, d1, is modified only once to dnew, then the display of the first content 502 may switch back and forth between the first distance, d1, and dnew. For example, assuming the first distance, d1, is modified four times in sequence to each of a plurality of new distances, dnew1, dnew2, dnew3, dnew4, the display of the first content 502 may cycle back to the first distance, d1, and then forwards through dnew1, dnew2, dnew3, dnew4. Alternatively, the display of the first content 502 may cycle back to the first new distance, dnew1, and then forwards through dnew2, dnew3, dnew4. The process may repeat one or more times. Tracking eye movements for these more specific forms of distance modification may improve accuracy in determining which of the first and second content 502, 504 the user is looking at.

The first distance, d1, may modified by modifying the disparity of first and second images which represent the first content, which are simultaneously and respectively displayed by the left and right-hand screens 106A, 106B of the AR display device 102.

In some example embodiments, the modifying operation 402 may alternatively or additionally comprise modifying either or both of the first and second content such that one appears to move laterally (e.g. up, down, left, right and/or diagonally) with respect to the other. As before, tracking eye movements subsequent to the modification may enable determination as to which of the first and second content the user is looking at.

For example, the first content 502 may be moved up, down, left, right, and/or diagonally whereas the second content 504 may remain static or be moved in a different direction. For example, where the AR display device 102 is performing the operations 400, the AR display device 102 may control the display of the second content 504 via transmitting one or more control signals to the smartphone 506. The smartphone 506 may, via its operating system or an application configured to be responsive to control signals from the AR display device 102, perform the modification in response to the one or more control signals. If it is determined that the second content 504 is not being looked at, the smartphone 506 may also be responsive to control signals from the AR display device 102 to change the display of the second content. The one or more control signals may indicate which modification(s) to perform. On the other hand, where the smartphone 506 is performing the above operations 400, the smartphone may cause or control modification of the first content 502 and, if needed, may cause or control the change of the display of the first content via transmitting one or more control signals to the AR display device 102. Where the smartphone 506 is transmitting the first content 502 to the AR display device 102, the modification and/or changing can be performed at the smartphone 506 before the first content is transmitted to the AR display device.

The different direction may be the opposite direction to that used for the first content 502. For example, the first content 502 may be moved rightwards, and the second content 504 may be moved leftwards.

Alternatively, the first content 502 may remain static and the second video content 506 may be moved up, down, left, right, or even diagonally, or vice versa.

Note that lateral movement of the second content 506 does not imply that its display device, e.g., the smartphone 506, moves; rather, the second content may appear to move in a scroll-like manner on the display screen.

Figure 6A:
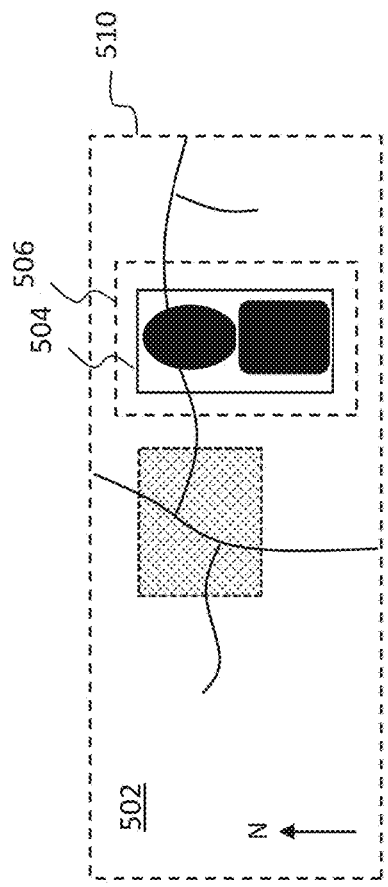
FIG. 6A is a front view of overlapping first and second content.

FIG. 6A shows a user's view of the first content 502 and the second content 504 whilst wearing the AR display device 102.

The first content 502 may, for example, comprise a portion of a map and the second content 504 may comprise a photograph.

Figure 6B:
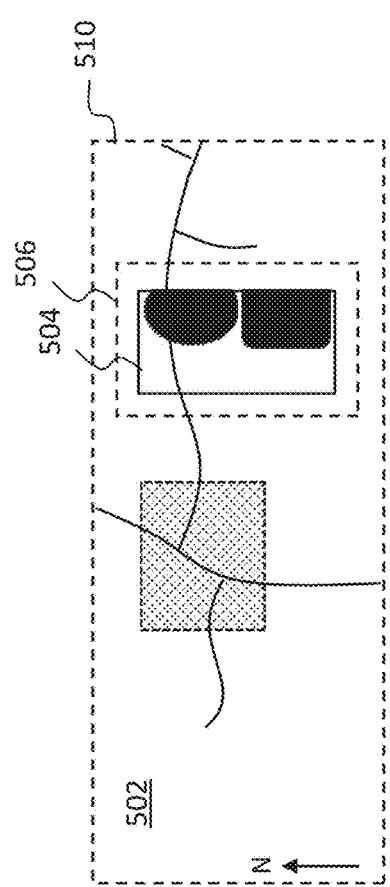
FIG. 6B is a front view of the overlapping first and second content, after modifying the display of the first and second content, according to some example embodiments.

FIG. 6B shows how the user's view might change responsive to a modification operation 402 whereby one appears to move laterally with respect to the other.

As is seen, the first content 502 moves (scrolls) leftwards within an AR display area 510 indicated by the dashed rectangle, possibly revealing a new portion of the map near the right-hand edge.

At the same time, the second content 504 moves (scrolls) rightwards over the smartphone screen area, possibly revealing a blank left-hand portion or part of another photograph.

Note that the shown motion amounts may be exaggerated, and, in practice, smaller and more subtle motions may be used to avoid disturbing the user 104.

If the user's eye movements track towards the right-hand side, it may be determined that the user 104 is looking at the second content 504/smartphone 506 and hence determined that the user is not looking at the first content 502. If the user's eye movements track towards the left-hand side, it may be determined that the user is looking at the first content 502 and hence determined that the user is not looking at the second content 504/smartphone 506.

Figure 6C:
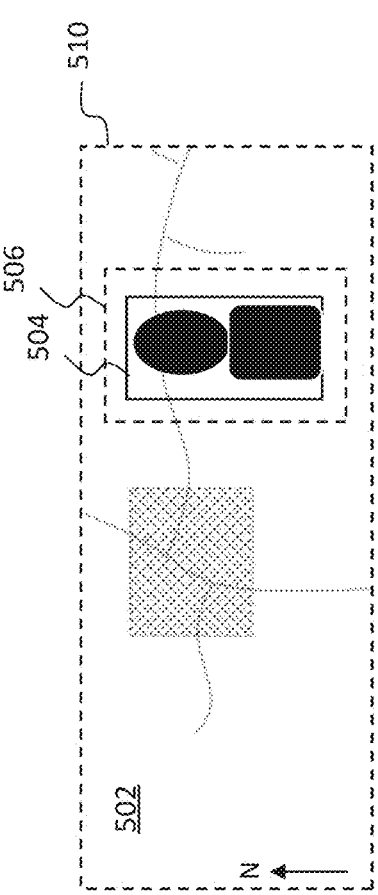
FIG. 6C is a front view of the overlapping first and second content, after modifying the transparency of the first content, according to some example embodiments.

Assuming the former to be the case, FIG. 6C shows an example result, which may be to change the display of the first content 502 which the user is not looking at by making it more transparent. This makes the second content 504 more visible to the user 104. At this time, the second content 504 may be returned to its original position.

Figure 6D:
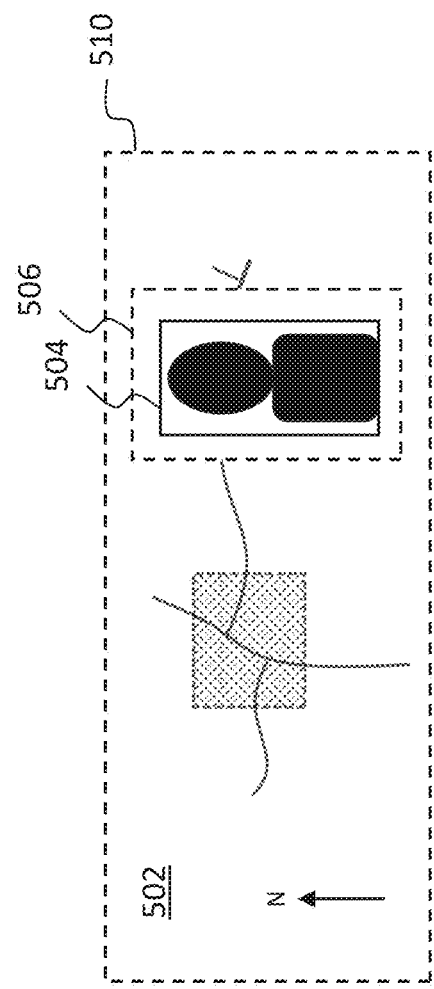
FIG. 6D is a front view of the overlapping first and second content, after modifying the viewing distance of the first content, according to some example embodiments.

Additionally, or alternatively, and as shown in FIG. 6D, the display of the first content 502 may be changed by changing the distance or depth which the user 104 perceives it so that it is behind (or further behind) the second content. This may make the first content 502 smaller and/or out-of-focus and/or obscured by the second content 504.

Additionally, or alternatively, the display of the first content may be changed so as to be disabled, at least temporarily, for example by switching-off the AR display device 102, transitioning it to a standby mode, or by making it 100% transparent.

In some example embodiments, where lateral movement is used in the modifying operation 403, the speed of lateral movement may be such that the user sees a motion parallax effect.

Motion parallax may be considered a monocular depth cue based on movements of objects with respect to one another. It is based on the perception that objects which are closer to the user appear to move faster than objects that are further away.

In some example embodiments, the first content 502 may be moved laterally at a first speed and the second content 504 may be moved laterally, possibly in the same direction, at a second speed, wherein first and second speeds are different. For example, the first speed may be greater than the second speed or vice versa. In some example embodiments, based on the measured distance of the smartphone 506 from the AR display device 102, the speed used for the second content may increase/decrease as it gets closer to/further from the AR display device 102.

In some example embodiments, another operation may comprise generating an initial estimate that a particular one of the first and second content 502, 504 is attended to by the user. The initial estimate may be based on one or more of the depth matching method (described above), historical data indicative of which content the user has been looking at over a recent number of time periods, the types of first and/or second video content 502, 504 being displayed, and/or user movements over a recent number of time periods. The modifying operation 402 may then modify the other content whilst maintaining the particular content static.

In some example embodiments, one or both of the first content and the second content 502, 504 of any of the above embodiments 504 have associated first and second audio data.

For example, the first content 502 may have associated navigation audio (e.g., "turn right, turn left") and the second content 504 may have an accompanying music track.

The first and/or second audio data may be modified in the same sense as the first and/or second content 502, 504. In other words, the first and/or second audio data is modified such that, when rendered, it may be perceived by the user 104 as tracking the modification to the first and/or second content 502, 504.

For example, if the first content 502 is moved further away/closer to the user 104, the associated first audio data may be output with reduced/increased volume. The reduction/increase in volume may be in proportion to the distance the first content 502 is moved further away/closer to the user 104.

For example, if the first content 502 scrolls leftwards/rightwards/upwards/downwards/diagonally, the associated first audio data may be pan leftwards/rightwards/upwards/downwards/diagonally in the same direction.

The same approach may be applied also to the second audio data for modifications made to the second content 504.

Where the associated first and/or second audio data represents immersive audio (e.g., multichannel or spatial audio) the rendering of said audio data may be modified in terms of perceived position such that the position tracks the movement of the first and/or second content 502, 504 in the above manner.

In the case of the second content 502, 504 panning the rendered second audio data leftwards/rightwards/upwards/downwards/diagonally may utilize appropriate output via a plurality of loudspeakers on the smartphone 506.

Alternatively, the second audio data may be transmitted to earphones or headphones worn by the user (which may comprise part of the AR display device 102) which may be configured to render the second audio data with the required panning, as well as to render the first audio data with, for example, panning in the opposite direction.

Additional benefits, in addition to those mentioned above, may include capture of user attention resources available for interaction, monitoring and/or modelling purposes in a distributed user interface scenario and optimization of content renderings. Additionally, example embodiments do not require use of cameras on the smartphone 506 (or any direct display device other than the AR display device 102) and hence the user 104 need not be in the field of view of such cameras.

Example Apparatus

FIG. 7 shows an apparatus according to some example embodiments. The apparatus may be configured to perform the operations described herein, for example operations described with reference to any disclosed process. The apparatus comprises at least one processor 700 and at least one memory 701 directly or closely connected to the processor. The memory 701 includes at least one random access memory (RAM) 701a and at least one read-only memory (ROM) 701b. Computer program code (software) 706 is stored in the ROM 701b. The apparatus may be connected to a transmitter (TX) and a receiver (RX). The apparatus may, optionally, be connected with a user interface (UI) for instructing the apparatus and/or for outputting data. The at least one processor 700, with the at least one memory 701 and the computer program code 706 are arranged to cause the apparatus to at least perform at least the method according to any preceding process, for example as disclosed in relation to the flow diagram of FIG. 4 and related features thereof.

FIG. 8 shows a non-transitory media 800 according to some embodiments. The non-transitory media 800 is a computer readable storage medium. It may be e.g. a CD, a DVD, a USB stick, a blue ray disk, etc. The non-transitory media 800 stores computer program instructions, causing an apparatus to perform the method of any preceding process for example as disclosed in relation to the flow diagram of FIG. 4 and related features thereof.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi.

A memory may be volatile or non-volatile. It may be e.g. a RAM, a SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus comprising:
   at least one processor; and
   at least one memory storing instructions that, when executed by the at least one processor, cause the apparatus at least to:
   track eye positions of a user during simultaneous display of first and second content to the user, wherein the first content comprises content displayed by a head-worn display device so that it is perceived by the user as located at a first distance from the user and the second content is displayed by a display screen of a further display device located at a second distance from the user;

modify, responsive to the difference between the first and second distance being below a predetermined threshold, the display of either, or both, of the first and second content such as to modify a spatial position at which they appear with respect to one another;

determine which of the displayed first and second content the user is looking at based at least on eye position movements, if any, tracked subsequent to the modifying;

cause change of the display of the other one of the first and second content which the user is not determined to be looking at such as to reduce its visibility relative to the content that the user is determined to be looking at.

2. The apparatus of claim 1, wherein the apparatus is further caused to:
estimate, based on eye positions of the user, a viewing distance of the user, and
wherein the modifying further comprises performing the modification in response to detecting that the viewing distance corresponds to the first distance or the second distance.

3. The apparatus of claim 1, wherein the modifying further comprises performing the modification in response to determining that the first and second content at least partially overlap one another with respect to the user's field-of-view.

4. The apparatus of claim 1, wherein
the modifying comprises modifying the distance at which the first content is perceived by the user from the first distance to a new distance from the user, which is away from the second distance, and
the determining which of the displayed first and second content the user is looking at comprises determining that the user is looking at the first content if eye position movements of the user correspond with a new viewing distance which moves towards, or matches, the new distance.

5. The apparatus of claim 4, wherein the distance at which the first content is perceived by the user is modified a plurality of times to each of a plurality of new distances in sequence.

6. The apparatus of claim 5, wherein at least some of the new distances are changed by a greater amount than that used for the preceding new distance of the sequence.

7. The apparatus of claim 4,
wherein the distance at which the first content is perceived by the user is modified by modifying the disparity of first and second images representing the first content which are simultaneously and respectively displayed by first and second screens of the head-worn display device.

8. The apparatus of claim 1,
wherein the modifying comprises at least modifying either, or both, of the first and second content such that one appears to move laterally with respect to the other.

9. The apparatus of claim 8,
wherein the modifying comprises modifying the first content such that it appears to move laterally at a first speed and the second content such that it appears to move laterally at a second speed, wherein the first speed is greater than the second speed.

10. The apparatus of claim 9, wherein the apparatus is further caused to:
detect motion of the further display device with respect to the head-worn display device,
wherein the modifying comprises increasing/decreasing the second speed as the further display device gets closer to/further from the head-worn display device.

11. The apparatus of claim 8, wherein the apparatus is further caused to generate an initial estimate that a particular one of the first and second content is being looked at by the user,
wherein the modifying comprises modifying the other one of the first and second content which the user is not determined to be looking at so that it appears to move laterally whilst maintaining the particular content static.

12. The apparatus of claim 1, wherein causing change of the display of the other one of the first and second content which the user is not determined to be looking at comprises:
disabling display of the other content;
reducing luminance of the other content;
reducing color saturation of the other content;
increasing transparency of the other content;
changing angular resolution of the other content; and/or
changing spatial resolution of the other content.

13. The apparatus of claim 1,
wherein in response to determining that the user is looking at the second content, causing change of the display of the other one of the first and second content which the user is not determined to be looking at comprises changing the distance at which the first content is perceived by the user such that it is behind the second content.

14. A method, comprising:
tracking eye positions of a user during simultaneous display of first and second content to the user, wherein the first content comprises content displayed by a head-worn display device so that it is perceived by the user as located at a first distance from the user and the second content is displayed by a display screen of a further display device located at a second distance from the user;
modifying, responsive to the difference between the first and second distance being below a predetermined threshold, the display of either, or both, of the first and second content such as to modify a spatial position at which they appear with respect to one another;
determining which of the displayed first and second content the user is looking at based at least on eye position movements, if any, tracked subsequent to the modifying; and
causing change of the display of the other one of the first and second content which the user is not determined to be looking at such as to reduce its visibility relative to the content that the user is determined to be looking at.

15. The method of claim 14, further comprising:
estimating, based on eye positions of the user, a viewing distance of the user, and
wherein the modification is performed in response to detecting that the viewing distance corresponds to the first distance or the second distance.

16. The method of claim 14, wherein the modification is performed in response to determining that the first and second content at least partially overlap one another with respect to the user's field-of-view.

17. The method of claim 14, wherein the modification modifies the distance at which the first content is perceived by the user from the first distance to a new distance from the user, which is away from the second distance, and the user is determined to be looking at the first content if eye position movements of the user correspond with a new viewing distance which moves towards, or matches, the new distance.

18. The method of claim 17, wherein the distance at which the first content is perceived by the user is modified by modifying the disparity of first and second images representing the first content which are simultaneously and respectively displayed by first and second screens of the head-worn display device.

19. The method of claim 14, wherein the modification modifies either, or both, of the first and second content such that one appears to move laterally with respect to the other.

20. The method of claim 19, wherein the modification modifies the first content such that it appears to move laterally at a first speed and the second content such that it appears to move laterally at a second speed, wherein the first speed is greater than the second speed.

21. A non-transitory computer readable medium comprising program instructions that, when executed by an apparatus, cause the apparatus to perform at least the following:

tracking eye positions of a user during simultaneous display of first and second content to the user, wherein the first content comprises content displayed by a head-worn display device so that it is perceived by the user as located at a first distance from the user and the second content is displayed by a display screen of a further display device located at a second distance from the user;

modifying, responsive to the difference between the first and second distance being below a predetermined threshold, the display of either, or both, of the first and second content such as to modify spatial position at which they appear with respect to one another;

determining which of the displayed first and second content the user is looking at based at least on eye position movements, if any, tracked subsequent to the modifying; and causing change of the display of the other one of the first and second content which the user is not determined to be looking at such as to reduce its visibility relative to the content that the user is determined to be looking at.

* * * * *